May 26, 1931. J. S. TAWRESEY 1,806,832
RAILWAY TRUCK
Filed March 25, 1929

INVENTOR
John S. Tawresey
By Rodney Bedell
ATTORNEY

Patented May 26, 1931

1,806,832

UNITED STATES PATENT OFFICE

JOHN S. TAWRESEY, OF EAST ORANGE, NEW JERSEY, ASSIGNOR, BY MESNE ASSIGNMENTS, TO GENERAL STEEL CASTINGS CORPORATION, OF GRANITE CITY, ILLINOIS, A CORPORATION OF DELAWARE

RAILWAY TRUCK

Application filed March 25, 1929. Serial No. 349,771.

My invention relates to railway rolling stock and consists in novel truck structure. My invention is particularly applicable to trucks having a plurality of axles and designed to be pivoted to the remainder of the vehicle in such a manner that, when the vehicle is on a curve, a part of the truck frame in which one of the truck axles is mounted will move transversely of the track and another part of the frame in which another axle is mounted will have no transverse movement relative to the track, or will move a different distance than the part of the truck frame in which the first mentioned axle is mounted.

Heretofore, it has been customary to provide sufficient lateral play between the wheel hubs and the journal boxes, or between the boxes and the truck pedestals, or at both points, to permit the axles to move transversely of the frame a sufficient distance to accommodate the thrust of the rails on the flanges of the wheel treads. With prior structure, the resulting play between wheel hub, box and pedestal has rendered the fit between these parts undesirably loose and frequently necessitated the elimination of the collars on the outer ends of the journals thereby eliminating the advantage attending the use of these collars for centering the boxes in the frame. One of the objects of my invention is to eliminate the necessity for any substantial relative transverse movement of the axle, its boxes and the corresponding pedestals.

In trucks of the class described, it is usually unnecessary for each axle to have the maximum amount of lateral motion and, since provision for excessive lateral motion is undesirable, the fit between the journal boxes and the wheel hubs and pedestals of one axle has been different from the fit between the boxes, hubs and pedestals of the other axle. As a result, the various boxes of a truck have not always been interchangeable and, in the event of replacement, it is necessary to select the proper box or axle and this naturally required the stocking of additional parts at the various repair shops of a railroad in order to make prompt and satisfactory repairs.

A further object of my invention is to eliminate the above mentioned disadvantage by making all of the boxes, axles and pedestals of the type of truck described interchangeable with each other without making all of the parts with undesirable loose fit.

In the accompanying drawings which illustrate my invention—

Figures 1, 2, 3, 4:
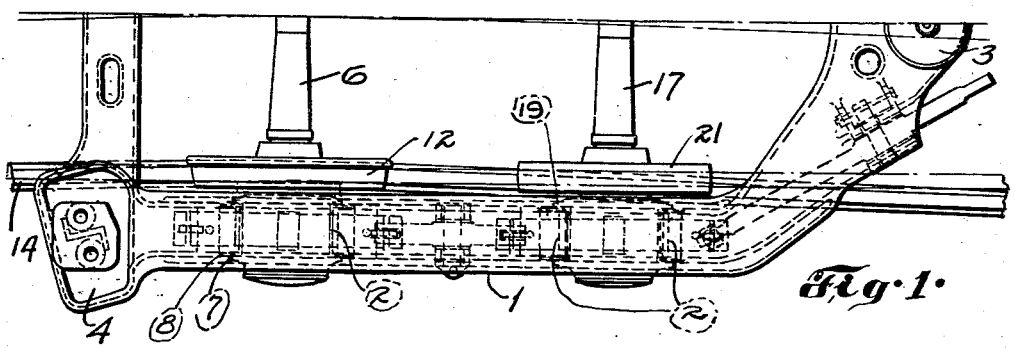
Figure 1 is a top view of one longitudinal half of a locomotive four wheel trailer truck embodying my invention and indicating the different positions of straight and curved rails in the track on which the truck is mounted.
Figure 2 is a side elevation of the truck shown in Figure 1.
Figure 3 is a vertical transverse section taken on line 3—3 of Figure 2.
Figure 4 is a similar section illustrating a modified structure utilizing a friction box.

The truck frame 1 is of a familiar type which includes integral pedestal jaws 2, a central pivot plate 3 near one end for connecting the truck to the main frame of the locomotive, and pockets 4 at the opposite end for mounting cradle or superstructure supporting side bearings.

The journal boxes 15 mounted on the journals 16 of the axles 6 and 17 will have their flanges 19 slidably engaging the wear plates 20 mounted on the corresponding pedestal jaws but holding the boxes against substantial movement transversely of the frame. The fit between the interengaging elements of each bearing 23, journal and box will also be close enough to prevent any substantial play between these parts transversely of the frame. The wheels 12 mounted on the rear axle 6 will have the usual rail engaging flanges 13. The wheels 21 mounted on the forward axle 17 will have flangeless treads 22 so that the wheels can move transversely of the rail to a greater extent than is possible with the usual flanged tread. This arrangement will permit the forward axle 17 to move transversely of the rail to the same extent that the adjacent part of the truck frame will move without requiring any undesirable play between the journals and boxes and between the boxes and pedestals. This arrangement also eliminates friction due to the lateral thrust of wheel flanges against the inner rail of the curved track.

The construction described makes it possible to use the same journals, boxes and pedestals throughout the truck so that the boxes and axles may be interchanged if desired or otherwise convenient.

My invention is also applicable to trucks using the ordinary A. R. A. friction boxes and in Figure 4 I illustrate a modification of my invention which includes an axle 24 having a journal 25 on which is mounted the box 26 mounted between the wear plates 27 in pedestal legs 28. The box flanges 29 will fit the wear plates, or the pedestal jaws if no wear plates are used, so as to permit free sliding movement of the box vertically in the pedestal but holding the box against substantial movement transversely of the pedestal. The journal brass 30 has lugs 31 seated in recesses in the box in the usual manner and the fit between the interengaging elements of the journal, brass and box will be close enough to prevent any substantial relative movement of these parts transversely of the frame. The wheels 32 mounted on axle 24 will have no rail-engaging flanges similarly to the wheel indicated in Figure 3.

While it is unlikely that one truck will include boxes of two different types, it is possible to use anti-friction boxes on one pair of journals and A. R. A. friction boxes on the other pair of journals. Such a construction might be desirable where there is a greater load on one pair of wheels than on the other such, for instance, as in trailer trucks equipped with booster motors or a spring equalizing system which applies a greater load to one axle than the other.

While I have illustrated and described a locomotive four wheel trailer truck, my invention is not limited to such a device but may be used on any railroad vehicle containing two or more axles mounted in a fixed frame or mounted in any way so that travel on a curved track tends to shift one of the axles transversely of the track in an opposite direction from or to a greater extent than the other axle, and I contemplate the exclusive use of my invention irrespective of such modifications in its use or other details of construction as come within the scope of my claims.

I claim:

1. In a railway vehicle truck, a plurality of axles, wheels with rail engaging flanges on only one of said axles, wheels with flangeless treads on all of the other of said axles, journal boxes mounted on said axles, a frame carried by said boxes and having a truck pivoting element at one side of said axles, said boxes being interchangeable with each other.

2. In a railway vehicle truck, a plurality of axles, wheels with rail engaging flanges on only one of said axles, wheels with flangeless treads on all of the other of said axles, journal boxes with anti-friction bearing elements mounted on said axles, a frame carried by said boxes and having a truck pivoting element at one side of said axles, said boxes being interchangeable with each other.

3. In a railway vehicle truck, a plurality of axles, wheels with rail engaging flanges on only one of said axles, wheels with flangeless treads on all of the other of said axles, journal boxes mounted on said axles, a frame carried by said boxes and having a truck pivoting element at one side of said axles, said boxes being held against substantial movement relative to said axles and frame transversely of the truck.

4. In a railway vehicle truck, a plurality of axles, wheels with rail engaging flanges on only one of said axles, wheels with flangeless treads on all of the other of said axles, journal boxes with anti-friction bearing elements mounted on said axles, a frame carried by said boxes and having a truck pivoting element at one side of said axles, said boxes being held against substantial movement relative to said axles and frame transversely of the truck.

5. In a railway vehicle truck, a plurality of axles, wheels with rail engaging flanges on only one of said axles, wheels with flangeless treads on all of the other of said axles, journal boxes mounted on said axles, a frame carried by said boxes and having a truck pivoting element at one side of said axles, said boxes being held against substantial movement relative to said axles and frame transversely of the truck, and being interchangeable with each other.

6. In a railway vehicle truck, a plurality of axles, wheels with rail engaging flanges on only one of said axles, wheels with flangeless treads on all of the other of said axles, journal boxes with anti-friction bearing elements mounted on said axles, a frame carried by said boxes and having a truck pivoting element at one side of said axles, said boxes being held against substantial movement relative to said axles and frame transversely of the truck, and being interchangeable with each other.

7. In a railway locomotive trailer truck, a frame having a truck pivoting element for attachment to the locomotive main frame and having a portion spaced from said element and adapted to support a superstructure load, a plurality of axles between said element and said load supporting portion, journal boxes mounted on one of said axles and slidable vertically in said frame and held against substantial movement transversely of the truck relative to said frame and the axle on which they are mounted, and wheels with flangeless treads mounted on said axle so as to move with said axle, boxes and frame transversely of the rail when the truck is rounding a curve.

8. In a railway locomotive trailer truck, a frame having a truck pivoting element for attachment to the locomotive main frame and having a portion spaced from said element and adapted to support a superstructure load, a plurality of axles between said element and said load supporting portion, journal boxes with anti-friction bearing elements mounted on one of said axles and slidable vertically in said frame and held against substantial movement transversely of the truck relative to said frame and the axle on which they are mounted, and wheels with flangeless treads mounted on said axle so as to move with said axle, boxes and frame transversely of the rail when the truck is rounding a curve.

9. In a railway locomotive trailer truck, a frame having a truck pivoting element for attachment to the locomotive main frame and having a portion spaced from said element and adapted to support a superstructure load, a plurality of axles between said element and said load supporting portion, journal boxes mounted on said axles and slidable vertically in said frame and held against substantial movement transversely of the truck relative to said frame and said axles, wheels with flangless treads mounted on one of said axles so as to move with the same and the corresponding boxes and the frame transversely of the rail when the truck is rounding a curve, and wheels mounted on another of said axles and provided with rail engaging flanges.

10. In a railway locomotive trailer truck, a frame having a truck pivoting element for attachment to the locomotive main frame and having a portion spaced from said element and adapted to support superstructure load, a plurality of axles between said element and said load supporting portion, journal boxes with anti-friction bearing elements mounted on said axles and slidable vertically in said frame and held against substantial movement transversely of the truck relative to said frame and said axles, wheels with flangeless treads mounted on one of said axles so as to move with the same and the corresponding boxes and the frame transversely of the rail when the truck is rounding a curve, and wheels mounted on another of said axles and provided with rail engaging flanges.

11. In a railway locomotive trailer truck, a frame having a truck pivoting element for attachment to the locomotive main frame and having a portion spaced from said element and adapted to carry a load, a plurality of axles between said element and said load supporting portion, journal boxes mounted in said frame and on said axles and held against substantial movement transversely of the truck relative to said frame and said axles, wheels with rail engaging flanges mounted on the axle nearest said load supporting portion, and wheels with flangeless treads mounted on the other axle or axles so as to move therewith and with the corresponding boxes and with the frame transversely of the rail when the truck is rounding a curve.

12. In a railway locomotive trailer truck, a frame having a truck pivoting element for attachment to the locomotive main frame and having a portion spaced from said element and adapted to carry a load, a plurality of axles between said element and said load supporting portion, journal boxes with anti-friction bearing elements mounted in said frame and on said axles and held against substantial movement transversely of the truck relative to said frame and said axles, wheels with rail engaging flanges mounted on the axle nearest said load supporting portion, and wheels with flangeless treads mounted on the other axle or axles so as to move therewith and with the corresponding boxes and with the frame transversely of the rail when the truck is rounding a curve.

In testimony whereof I hereunto affix my signature this 25th day of February, 1929.

JOHN S. TAWRESEY.